(12) United States Patent  
Takahara et al.

(10) Patent No.: US 12,316,237 B2  
(45) Date of Patent: May 27, 2025

(54) POWER CONVERSION DEVICE, MOTOR DRIVE UNIT, AND REFRIGERATION CYCLE APPARATUS

(71) Applicant: Mitsubishi Electric Corporation, Tokyo (JP)

(72) Inventors: Takaaki Takahara, Tokyo (JP); Koichi Arisawa, Tokyo (JP); Keisuke Uemura, Tokyo (JP); Haruka Matsuo, Tokyo (JP); Koyo Matsuzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 18/043,132

(22) PCT Filed: Oct. 26, 2020

(86) PCT No.: PCT/JP2020/040133  
§ 371 (c)(1),  
(2) Date: Feb. 27, 2023

(87) PCT Pub. No.: WO2022/091186  
PCT Pub. Date: May 5, 2022

(65) Prior Publication Data  
US 2023/0308025 A1  Sep. 28, 2023

(51) Int. Cl.  
*H02M 5/458* (2006.01)  
*H02M 1/32* (2007.01)  
*H02P 27/06* (2006.01)

(52) U.S. Cl.  
CPC ........... *H02M 5/4585* (2013.01); *H02M 1/32* (2013.01); *H02P 27/06* (2013.01); *F25B 2600/021* (2013.01)

(58) Field of Classification Search  
CPC ....... H02M 5/4585; H02M 1/32; H02P 27/06; F25B 2600/021  
See application file for complete search history.

(56) References Cited

U.S. PATENT DOCUMENTS 7,053,569 B2  5/2006  Takahashi  
7,650,760 B2  1/2010  Nakata et al.  
(Continued)

FOREIGN PATENT DOCUMENTS

EP  2667502 A1  11/2013  
EP  3537583 A1  9/2019  
(Continued)

OTHER PUBLICATIONS

International Search Report of the International Searching Authority mailed Feb. 1, 2022, issued in related International Application No. PCT/JP2021/044502 (and English translation).  
(Continued)

*Primary Examiner* — Zoheb S Imtiaz  
(74) *Attorney, Agent, or Firm* — Posz Law Group, PLC

(57) ABSTRACT

A power conversion device includes a rectification unit that rectifies first alternating current (AC) power supplied from a commercial power supply, a capacitor connected to an output end of the rectification unit, an inverter that converts power output from the rectification unit and from the capacitor into second AC power, and outputs the second AC power to a load including a motor, which inverter is connected to both ends of the capacitor, and a control unit that controls operation of the inverter to output the second AC power from the inverter to the load to reduce current flowing to the capacitor, which second AC power includes a pulsation that depends on a pulsation of power flowing from the rectification unit to the capacitor. No discharge circuit and no overvoltage protection circuit are provided for the capacitor.

15 Claims, 13 Drawing Sheets

(56) References Cited

U.S. PATENT DOCUMENTS

| | | | |
|---|---|---|---|
| 8,450,955 B2 | 5/2013 | Ide et al. | |
| 10,439,542 B2 | 10/2019 | Taniguchi et al. | |
| 10,903,755 B2 | 1/2021 | Zhou et al. | |
| 11,682,992 B2 | 6/2023 | Takahashi et al. | |
| 2012/0113693 A1* | 5/2012 | Sekimoto | H02M 5/458 363/37 |
| 2019/0260304 A1* | 8/2019 | Ogawa | H01F 41/00 |
| 2019/0280606 A1* | 9/2019 | Ono | H02M 5/42 |
| 2020/0212818 A1 | 7/2020 | Kataoka et al. | |
| 2021/0104958 A1* | 4/2021 | Hiranuma | H02M 1/32 |
| 2021/0249854 A1* | 8/2021 | Rupp | H02H 9/02 |
| 2023/0336090 A1 | 10/2023 | Takahara et al. | |
| 2023/0378867 A1 | 11/2023 | Takahara et al. | |
| 2024/0380345 A1 | 11/2024 | Matsuo et al. | |
| 2025/0023497 A1 | 1/2025 | Matsuo et al. | |

FOREIGN PATENT DOCUMENTS

| | | |
|---|---|---|
| JP | H02-269477 A | 11/1990 |
| JP | H07-071805 A | 3/1995 |
| JP | H10-248300 A | 9/1998 |
| JP | 2001-037281 A | 2/2001 |
| JP | 2002-051589 A | 2/2002 |
| JP | 2002354826 A | 12/2002 |
| JP | 2004-343993 A | 12/2004 |
| JP | 2005-020836 A | 1/2005 |
| JP | 2007181358 A | 7/2007 |
| JP | 2009017673 A | 1/2009 |
| JP | 2010-288440 A | 12/2010 |
| JP | 2011-205729 A | 10/2011 |
| JP | 2012-044830 A | 3/2012 |
| JP | 2012-157242 A | 8/2012 |
| JP | 2012-196142 A | 10/2012 |
| JP | 2016-073203 A | 5/2016 |
| JP | 2017-046430 A | 3/2017 |
| JP | 2017-055466 A | 3/2017 |
| JP | 2018-014854 A | 1/2018 |
| JP | 2019-083682 A | 5/2019 |
| JP | 2019-161757 A | 9/2019 |
| WO | 2020/234971 A1 | 11/2020 |

OTHER PUBLICATIONS

International Search Report of the International Searching Authority mailed Dec. 1, 2020, issued in related International Application No. PCT/JP2020/040131 (and English machine translation).

International Search Report of the International Searching Authority mailed Dec. 1, 2020, issued in related International Application No. PCT/JP2020/040132 (and English machine translation).

Extended European Search Report dated Nov. 6, 2023 issued in related EP Patent Application No. 20959702.0.

Office Action dated Dec. 11, 2023 issued in related AU Patent Application No. 2020475165.

Office Action dated Nov. 14, 2023 issued in related IN Patent Application No. 202327013852.

Office Action dated Nov. 24, 2023 issued in related IN Patent Application No. 202327017512.

Office Action dated Nov. 16, 2023 issued in corresponding IN patent application No. 202327013851.

International Search Report of the International Searching Authority mailed Dec. 1, 2020, issued in corresponding International Application No. PCT/JP2020/040133 (and English Machine Translation).

International Search Report of the International Searching Authority dated Feb. 1, 2022 for the related International application No. PCT/JP2021/044501 (with English translation).

Office Action mailed Dec. 26, 2023 in corresponding Japanese Patent Application No. 2022-558619 (and English machine translation).

* cited by examiner

POWER CONVERSION DEVICE, MOTOR DRIVE UNIT, AND REFRIGERATION CYCLE APPARATUS

CROSS REFERENCE TO RELATED APPLICATION

This application is a U.S. national stage application of PCT/JP2020/040133 filed on Oct. 26, 2020, the contents of which are incorporated herein by reference.

TECHNICAL FIELD

The present disclosure relates to a power conversion device that converts alternating current (AC) power into desired power, to a motor drive unit, and to an apparatus that utilizes a refrigeration cycle (hereinafter referred to as refrigeration cycle apparatus).

BACKGROUND

Power conversion devices have conventionally been used that convert AC power supplied from an AC power supply into desired AC power, and supply the resulting AC power to a load such as an air conditioner. For example, Patent Literature 1 discloses a technology in which a power conversion device, which is an air conditioner control device, rectifies AC power supplied from an AC power supply in a diode stack, serving as a rectification unit, smooths the power in a smoothing capacitor, converts the resulting power into desired AC power in an inverter consisting of multiple switching elements, and outputs the resulting AC power to a compressor motor, which is a load.

Patent Literature

Patent Literature 1: Japanese Patent Application Laid-open No. H7-71805

However, the above conventional technology causes a high current to flow to the smoothing capacitor. This presents a problem of faster aging degradation of the smoothing capacitor. Possible countermeasures include increasing of the capacitance of the smoothing capacitor to reduce or prevent a ripple variation in the capacitor voltage, and use of a smoothing capacitor having high resistance to degradation caused by ripples. These countermeasures, however, lead to an increase in cost of components of the capacitor, and an increase in size of apparatus.

SUMMARY

The present disclosure has been made in view of the foregoing, and it is an object of the present disclosure to provide a power conversion device that reduces degradation of the capacitor for smoothing, and can also prevent an increase in size of apparatus.

In order to solve the above problem and achieve the object, a power conversion device according to the present disclosure includes: a rectification unit that rectifies first alternating current power supplied from a commercial power supply; a capacitor connected to an output end of the rectification unit; an inverter that converts power output from the rectification unit and from the capacitor into second alternating current power, and outputs the second alternating current power to a load including a motor, the inverter being connected to both ends of the capacitor; and a control unit that controls operation of the inverter to output the second alternating current power from the inverter to the load to reduce current flowing to the capacitor, the second alternating current power including a pulsation that depends on a pulsation of power flowing from the rectification unit to the capacitor, wherein no discharge circuit and no overvoltage protection circuit are provided for the capacitor.

A power conversion device according to the present disclosure provides an advantage in reduction of degradation of the capacitor for smoothing, and capability to prevent an increase in size of apparatus.

DETAILED DESCRIPTION

A power conversion device, a motor drive unit, and a refrigeration cycle apparatus according to embodiments of the present disclosure will be described in detail below with reference to the drawings.

First Embodiment

Figure 1:
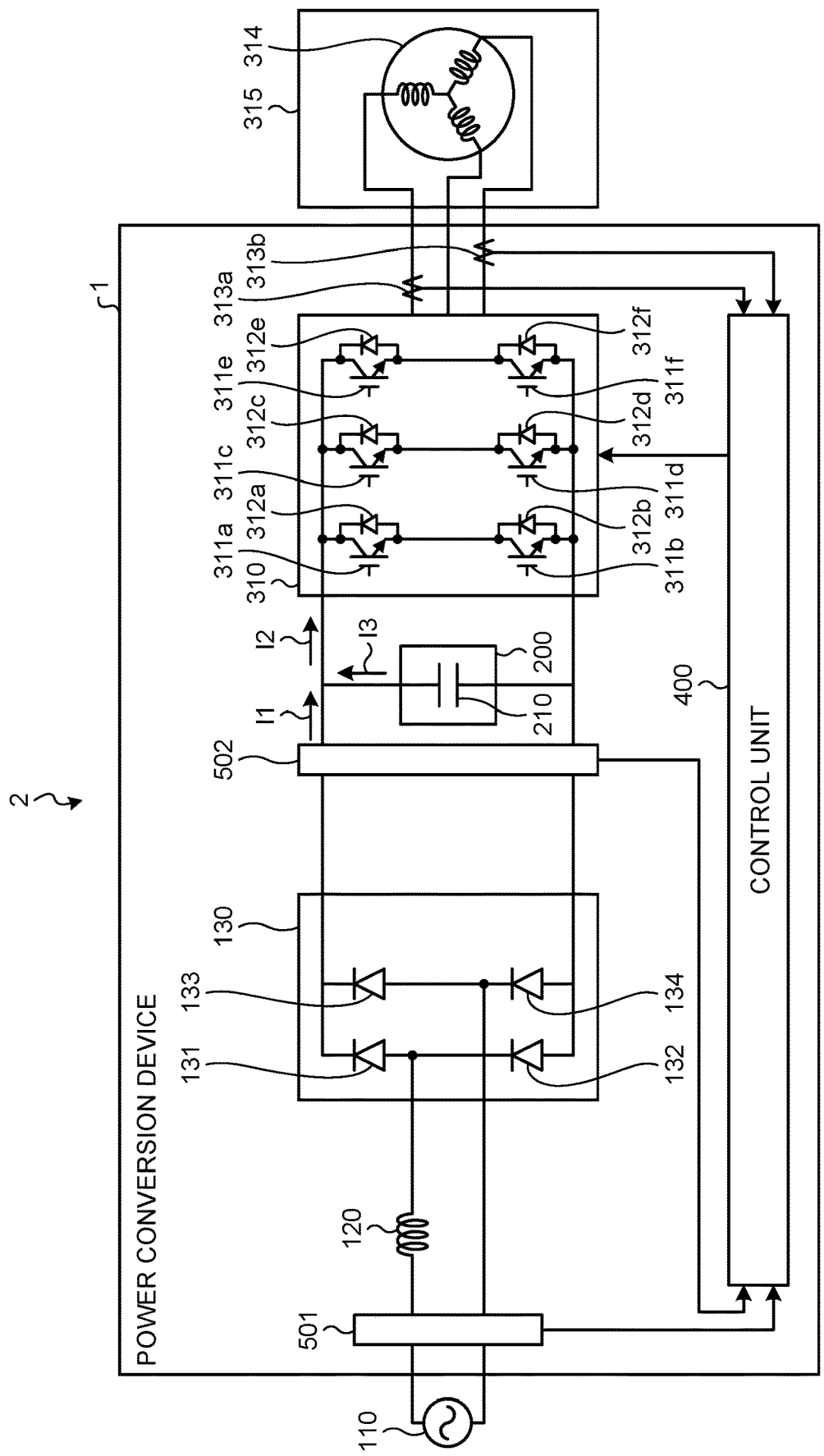
FIG. 1 is a diagram illustrating an example configuration of a power conversion device according to a first embodiment.

FIG. 1 is a diagram illustrating an example configuration of a power conversion device 1 according to a first embodiment. The power conversion device 1 is connected to a commercial power supply 110 and to a compressor 315. The power conversion device 1 converts first alternating current (AC) power having a supply voltage Vs supplied from the commercial power supply 110 into second AC power having desired amplitude and phase, and supplies the second AC power to the compressor 315. The power conversion device 1 includes a voltage-current detection unit 501, a reactor 120, a rectification unit 130, a voltage detection unit 502, a smoothing unit 200, an inverter 310, current detection units 313a and 313b, and a control unit 400. Note that the power conversion device 1 and a motor 314 included in the compressor 315 together form a motor drive unit 2.

The voltage-current detection unit 501 detects a voltage value and a current value of the first AC power having the supply voltage Vs supplied from the commercial power supply 110, and outputs the voltage value and the current value detected to the control unit 400. The reactor 120 is connected between the voltage-current detection unit 501 and the rectification unit 130. The rectification unit 130 includes a bridge circuit including rectifying elements 131 to 134. The rectification unit 130 rectifies the first AC power having the supply voltage Vs supplied from the commercial power supply 110, and outputs the power resulting from rectification. The rectification unit 130 performs full-wave rectification. The voltage detection unit 502 detects a voltage value of the power resulting from rectification performed by the rectification unit 130, and outputs the voltage value detected to the control unit 400. The smoothing unit 200 is connected to an output end of the rectification unit 130 via the voltage detection unit 502. The smoothing unit 200 includes a capacitor 210, which functions as a smoothing element, to smooth the power resulting from rectification performed by the rectification unit 130. The capacitor 210 is, for example, an electrolytic capacitor, a film capacitor, or the like. The capacitor 210 has a capacitance sufficient for smoothing the power resulting from rectification performed by the rectification unit 130. The voltage appearing on the capacitor 210 resulting from the smoothing has a waveform shape including a voltage ripple dependent on the frequency of the commercial power supply 110 being superimposed on a direct current (DC) component, rather than a waveform shape of a full-wave rectified voltage of the commercial power supply 110, meaning that the voltage appearing on the capacitor 210 resulting from the smoothing does not have a high pulsation. This voltage ripple has a frequency that is twice the frequency of the supply voltage Vs when the commercial power supply 110 is of a single-phase type, and has a primary component that is six times the frequency of the supply voltage Vs when the commercial power supply 110 is of a three-phase type. In a condition where the power input from the commercial power supply 110 and the power output from the inverter 310 do not change, this voltage ripple has an amplitude that is determined based on the capacitance of the capacitor 210. For example, the voltage ripple appearing on the capacitor 210 pulsates in a range having the maximum value thereof that is less than twice the minimum value thereof.

The inverter 310 is connected to both ends of the smoothing unit 200, i.e., both ends of the capacitor 210. The inverter 310 includes switching elements 311a to 311f and freewheeling diodes (i.e. reflux diode) 312a to 312f. The inverter 310 turns on or off the switching elements 311a to 311f under control of the control unit 400 to convert the power output from the rectification unit 130 and from the smoothing unit 200 into second AC power having desired amplitude and phase, and outputs the second AC power to the compressor 315. The current detection units 313a and 313b each detect a current value of one of three phase currents output from the inverter 310, and output the current value detected to the control unit 400. Note that obtaining current values of two phases of the three-phase current output from the inverter 310 allows the control unit 400 to calculate the current value of the other one phase output from the inverter 310. The compressor 315 is a load including the motor 314 for driving the compressor. The motor 314 rotates according to the amplitude and phase of the second AC power supplied from the inverter 310 thus to perform compression operation. For example, when the compressor 315 is a hermetic compressor for use in an apparatus such as an air conditioner, the load torque of the compressor 315 can often be considered as a constant torque load.

Note that, in the power conversion device 1, the arrangement of the components illustrated in FIG. 1 is merely by way of example, and the arrangement of the components is not limited to the example illustrated in FIG. 1. For example, the reactor 120 may be disposed downstream of the rectification unit 130. In the following description, the voltage-current detection unit 501, the voltage detection unit 502, and the current detection units 313a and 313b may be referred to as detection unit without distinction. In addition, the voltage value and the current value detected by the voltage-current detection unit 501, the voltage value detected by the voltage detection unit 502, and the current values detected by the current detection units 313a and 313b may each be referred to as detection value.

The control unit 400 obtains a voltage value and a current value of the first AC power having the supply voltage Vs from the voltage-current detection unit 501, obtains a voltage value of the power resulting from rectification performed by the rectification unit 130 from the voltage detection unit 502, and obtains, from the current detection units 313a and 313b, a current value of the second AC power having desired amplitude and phase, obtained by conversion performed by the inverter 310. The control unit 400 controls the operation of the inverter 310, specifically, turning on or off of the switching elements 311a to 311f included in the inverter 310, using a detection value detected by each of the detection units. In the present embodiment, the control unit 400 controls the operation of the inverter 310 to output, from the inverter 310 to the compressor 315, which is a load, the second AC power including a pulsation that depends on the pulsation of the power flowing from the rectification unit 130 to the capacitor 210 of the smoothing unit 200. An example of pulsation that depends on the pulsation of the power flowing to the capacitor 210 of the smoothing unit 200 is a pulsation that varies depending on a factor such as the frequency of the pulsation of the power flowing to the capacitor 210 of the smoothing unit 200. The control unit 400 reduces the current flowing to the capacitor 210 of the smoothing unit 200 through such operation. Note that the control unit 400 does not need to use all of the detection values obtained from the respective detection units, but may provide control using part of the detection values. In the present embodiment, the power conversion device 1 is configured such that the capacitor 210 and the inverter 310 are connected in parallel with each other, and does not include a discharge circuit or an overvoltage protection circuit for the capacitor 210.

In this respect, a discharge circuit is a circuit including an active element such as a switching element and a resistor to control the connect-disconnect status of the resistor for the capacitor 210 by turning on and off of the active element. Thus, no resistor is included that is connected in parallel with the capacitor 210 for a purpose of smoothing the voltages of respective capacitors connected in series, for a purpose of detecting the capacitor voltage, or for another purpose. The resistor to be included in the discharge circuit is used for a purpose of discharging an electric charge in the capacitor 210 in a certain time period, and thus, in one example, has a resistance value in a range from several ohms ($\Omega$) to several hundred ohms ($\Omega$) rather than a high resistance value of, e.g., 1 k$\Omega$ or higher. One example of the discharge circuit is a circuit including a switching element and a resistor connected in series with each other, and connected in parallel with the capacitor 210.

In addition, an overvoltage protection circuit is a circuit that protects a device to prevent the voltage of the capacitor 210 from increasing by a certain voltage or more by regenerative power of the motor 314, by a disturbance of a portion including the commercial power supply 110, or by another cause. An overvoltage protection circuit is not a snubber circuit for protecting a switching element from a surge voltage generated upon switching of a switching element. Examples of the type of snubber circuit include an RC snubber including a resistor and a capacitor, and a C snubber including only a capacitor. One example of overvoltage protection circuit is a circuit including a diode, a resistor, and a protection capacitor connected in series with one another, and connected to the capacitor 210. Note that, in an overvoltage protection circuit, in order to prevent the capacitor voltage from increasing, a capacitance greater than a capacitor capacitance for a snubber circuit is required, and a capacitor of 10 uF or higher is required. In addition, a resistor is not necessarily essential, and only a diode and a protection capacitor may be used in series connection.

An operation of the control unit 400 included in the power conversion device 1 will next be described. In the power conversion device 1 of the present embodiment, the load generated by the inverter 310 and the compressor 315 can be considered as a constant load, and the following description therefore assumes that a constant current load is connected to the smoothing unit 200 in view of the current output from the smoothing unit 200. In this respect, as illustrated in FIG. 1, the current flowing from the rectification unit 130 is referred to as current I1, the current flowing into the inverter 310 is referred to as current I2, and the current flowing from the smoothing unit 200 is referred to as current I3. The current I2 is the total current of the current I1 and the current I3. The current I3 can be expressed as the difference between the current I2 and the current I1, i.e., (current I2)−(current I1). The direction of the current I3 is defined such that the direction causing discharge of the smoothing unit 200 is the positive direction, and the direction causing charge of the smoothing unit 200 is the negative direction. That is, a current may flow into the smoothing unit 200 and may flow out of the smoothing unit 200.

Figure 2:
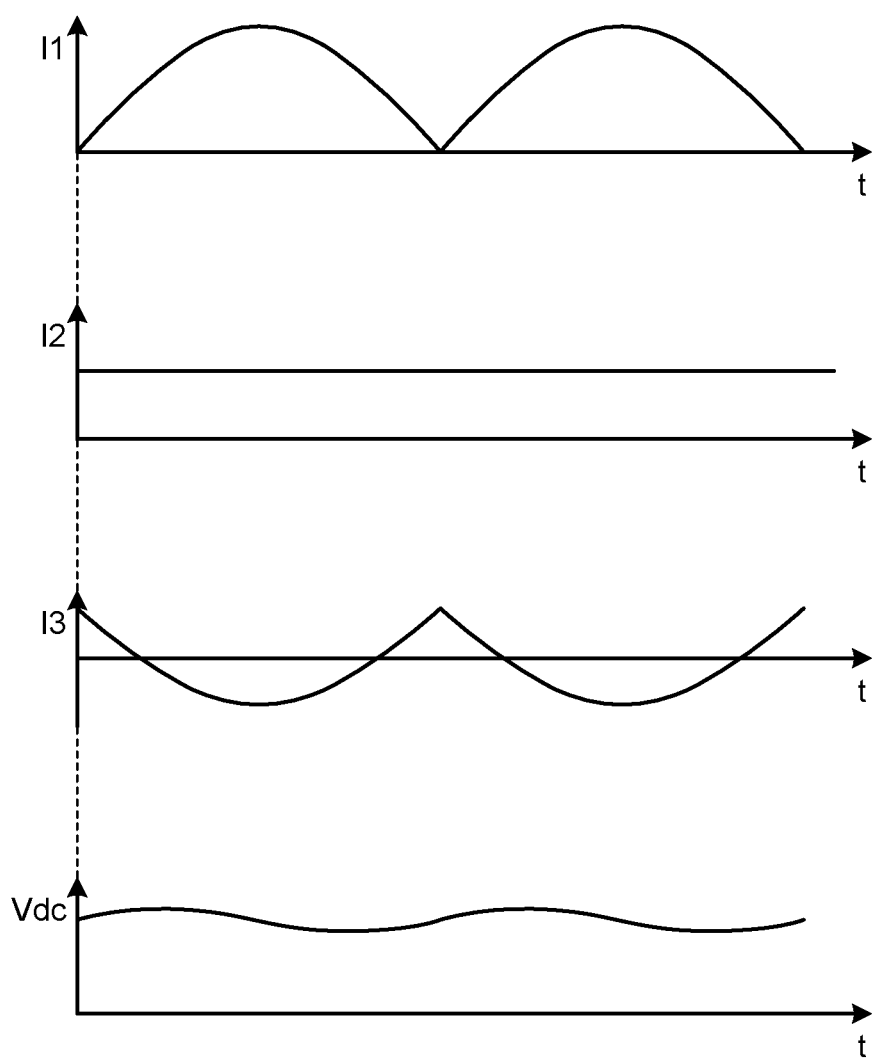
FIG. 2 is a diagram illustrating, as a comparative example, an example of currents and of a capacitor voltage of a capacitor in a smoothing unit when the current output from the rectification unit is smoothed by the smoothing unit to maintain the current flowing into the inverter to be constant.

FIG. 2 is a diagram illustrating, as a comparative example, an example of the currents I1 to I3 and a capacitor voltage Vdc of the capacitor 210 of the smoothing unit 200 when the current output from the rectification unit 130 is smoothed by the smoothing unit 200 to maintain the current I2 flowing into the inverter 310 to be constant. FIG. 2 illustrates, in order from top to bottom, the current I1, the current I2, the current I3, and the capacitor voltage Vdc of the capacitor 210 appearing depending on the current I3. The vertical axes for the currents I1, I2, and I3 each represent a current value, and the vertical axis for the capacitor voltage Vdc represents a voltage value. The horizontal axes all represent time t. Note that a carrier component of the inverter 310, which is in fact superimposed on the currents I2 and I3, is omitted here. This also applies to the description and illustration given below. As illustrated in FIG. 2, if the current I1 flowing from the rectification unit 130 is smoothed by the smoothing unit 200 to a sufficient degree in the power conversion device 1, the current I2 flowing into the inverter 310 would have a constant current value. However, a high current I3 flows to the capacitor 210 of the smoothing unit 200, which causes degradation. Accordingly, in the power conversion device 1 of the present embodiment, the control unit 400 controls the current I2 flowing into the inverter 310, that is, controls the operation of the inverter 310, to reduce the current I3 flowing into the smoothing unit 200.

Figure 3:
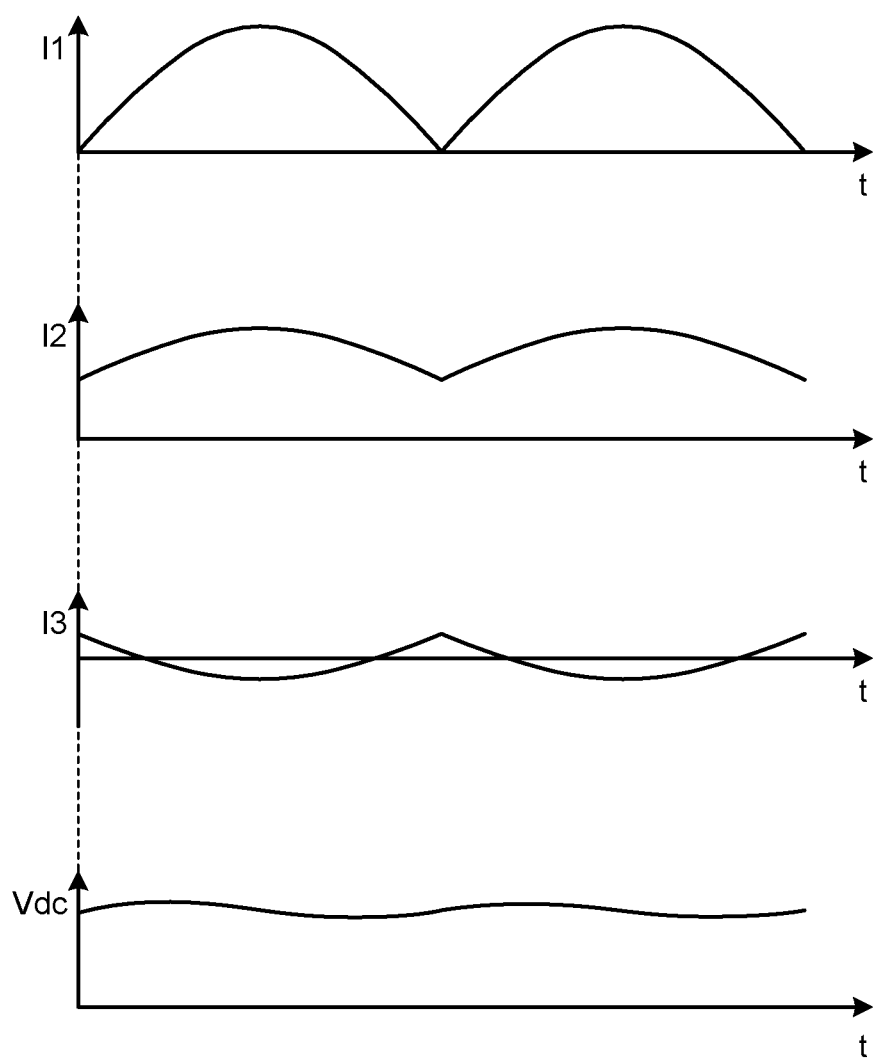
FIG. 3 is a diagram illustrating an example of currents and of the capacitor voltage of the capacitor in the smoothing unit when the control unit of the power conversion device according to the first embodiment controls the operation of the inverter to reduce the current flowing into the smoothing unit.

FIG. 3 is a diagram illustrating an example of the currents I1 to I3 and the capacitor voltage Vdc of the capacitor 210 of the smoothing unit 200 when the control unit 400 of the power conversion device 1 according to the first embodiment controls the operation of the inverter 310 to reduce the current I3 flowing into the smoothing unit 200. FIG. 3 illustrates, in order from top to bottom, the current I1, the current I2, the current I3, and the capacitor voltage Vdc of the capacitor 210 appearing depending on the current I3. The vertical axes for the currents I1, I2, and I3 each represent a current value, and the vertical axis for the capacitor voltage Vdc represents a voltage value. The horizontal axes all represent time t. The control unit 400 of the power conversion device 1 controls the operation of the inverter 310 to cause the current I2 such as one illustrated in FIG. 3 to flow into the inverter 310, thereby reducing the frequency component of the current flowing from the rectification unit 130 into the smoothing unit 200 to a lower level than that of the example of FIG. 2. This enables a reduction in the current I3 flowing into the smoothing unit 200. Specifically, the control unit 400 controls the operation of the inverter 310 to cause a current I2 including a pulsating current having a primary component that is the frequency component of the current I1 to flow into the inverter 310.

The frequency component of the current I1 is determined based on the frequency of the AC current supplied from the commercial power supply 110 and on the configuration of the rectification unit 130. This enables the control unit 400 to bring the frequency component of the pulsating current superimposed on the current I2 to a frequency component having predetermined amplitude and phase. The frequency component of the pulsating current superimposed on the current I2 has a waveform similar to the waveform of the frequency component of the current I1. As the control unit 400 causes the frequency component of the pulsating current superimposed on the current I2 to approach the frequency component of the current I1, the current I3 flowing into the smoothing unit 200 is more reduced, thereby enabling the pulsation voltage appearing on the capacitor voltage Vdc to be more reduced.

The control operation performed by the control unit 400 on a pulsation of the current flowing into the inverter 310 through control of the operation of the inverter 310 is equivalent to controlling a pulsation of the second AC power output from the inverter 310 to the compressor 315. The control unit 400 controls the operation of the inverter 310 to reduce the pulsation included in the second AC power output from the inverter 310 to less than the pulsation of the power output from the rectification unit 130. The control unit 400 controls the amplitude and phase of the pulsation included in the second AC power output from the inverter 310 to reduce the voltage ripple of the capacitor voltage Vdc, i.e., the voltage ripple appearing on the capacitor 210, to less than the voltage ripple appearing on the capacitor 210 of when the second AC power output from the inverter 310 includes no pulsation that depends on the pulsation of the power flowing to the capacitor 210. The situation in which the second AC power output from the inverter 310 includes no pulsation that depends on the pulsation of the power flowing to the capacitor 210 is a situation that is under a control such as one illustrated in FIG. 2.

Note that the AC current supplied from the commercial power supply 110 is not particularly limited, and may be a single-phase current or a three-phase current. The control unit 400 can determine the frequency component of the pulsating current to be superimposed on the current I2 according to the first AC power supplied from the commercial power supply 110. Specifically, the control unit 400 provides control to cause the pulsation waveform of the current I2 flowing into the inverter 310 to have a shape generated by addition of a DC component to a pulsation waveform whose primary component is a frequency component that is twice the frequency of the first AC power when the first AC power supplied from the commercial power supply 110 is of a single-phase type, or to a pulsation waveform whose primary component is a frequency component that is six times the frequency of the first AC power when the first AC power supplied from the commercial power supply 110 is of a three-phase type. The pulsation waveform is assumed to be, for example, a shape representing the absolute value of a sine wave or a shape of a sine wave. In this case, the control unit 400 may add, to the pulsation waveform, at least one frequency component among the components that are each an integer multiple of the frequency of the sine wave, as a predefined amplitude. The pulsation waveform may otherwise have a shape of a rectangular wave or a shape of a triangular wave. In this case, the control unit 400 may use predefined values for the amplitude and phase of the pulsation waveform.

The control unit 400 may compute the magnitude of the pulsation included in the second AC power output from the inverter 310 using the voltage applied across the capacitor 210 or the current flowing to the capacitor 210, or using the voltage or current of the first AC power supplied from the commercial power supply 110.

Figure 4:
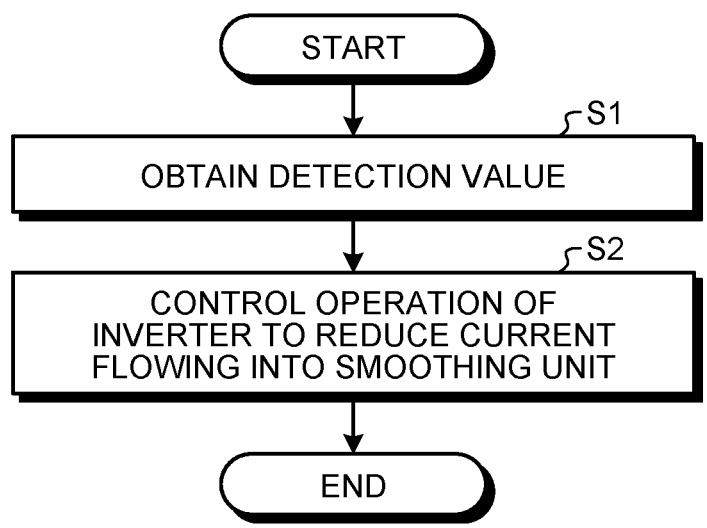
FIG. 4 is a flowchart illustrating an operation of the control unit included in the power conversion device according to the first embodiment.

An operation of the control unit 400 will next be described using a flowchart. FIG. 4 is a flowchart illustrating an operation of the control unit 400 included in the power conversion device 1 according to the first embodiment. The control unit 400 obtains detection values from the respective detection units of the power conversion device 1 (step S1). The control unit 400 controls the operation of the inverter 310 to reduce the current I3 flowing into the smoothing unit 200 based on the detection values obtained (step S2).

In this operation, in the power conversion device 1 illustrated in FIG. 1, the capacitance C of the capacitor 210 is determined within a range of Formula (1), where L [H] represents the inductance component in the power conversion device 1, C [F] represents the capacitance of the capacitor 210, Lm [H] represents the inductance component for one phase of the motor 314, Vcmax [V] represents the maximum voltage of the capacitor 210 in a stationary state, Im [A] represents the maximum current value of the motor 314, Is [A] represents the maximum current value of the commercial power supply 110, and Vdclim [V] represents the withstand voltage of the element to which the capacitor voltage Vdc is applied.

Formula 1:
$$C \geq \left(LIs^2 + \frac{3}{2}LmIm^2\right)/(Vdclim^2 - Vcmax^2) \quad (1)$$

Note that the inductance component L in the power conversion device 1 is a sum of an inductance component La of the reactor 120 and a system impedance Lk. The system impedance Lk includes a leakage from a transformer, a parasitic inductance component of wiring, or the like. A higher L value causes a greater increase in the capacitor voltage Vdc. The value of the system impedance Lk is thus assigned a maximum value conceivable in a practical use environment. This also applies to the description given below. In addition, the reactor 120 may be disposed, as described above, downstream of the rectification unit 130, that is, between the rectification unit 130 and the voltage detection unit 502.

Figure 5:
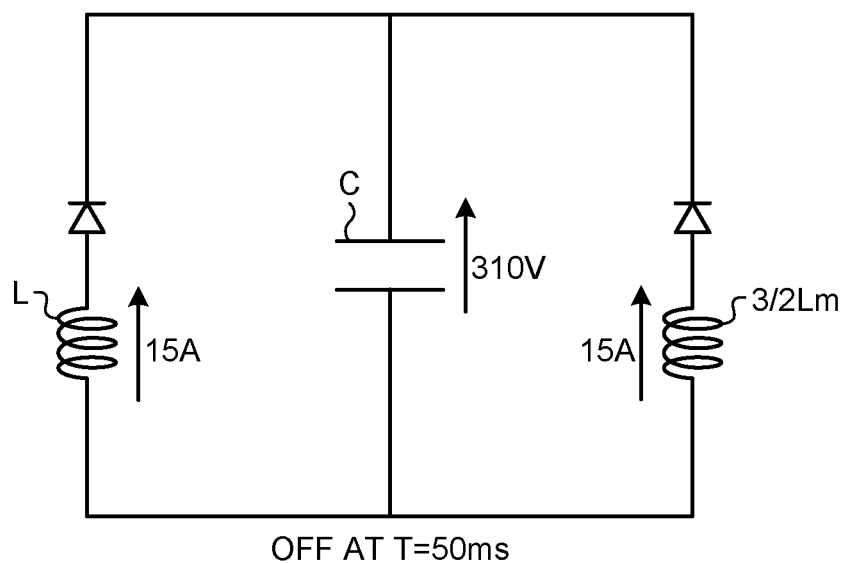
FIG. 5 is a diagram illustrating an example of equivalent circuit when the inverter is stopped operating in the power conversion device according to the first embodiment.
Figure 6:
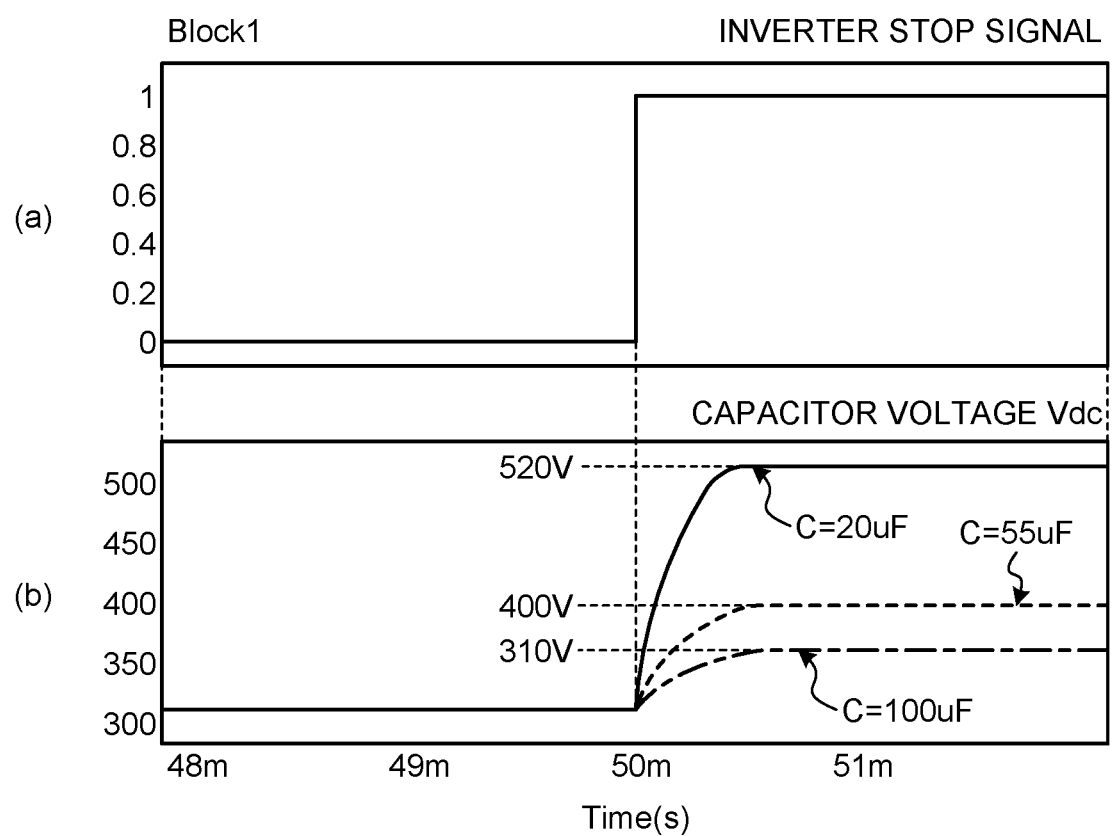
FIG. 6 is a diagram illustrating examples of the capacitor voltage when the inverter is stopped operating in the power conversion device according to the first embodiment.

FIG. 5 is a diagram illustrating an example of equivalent circuit when the inverter 310 is stopped operating in the power conversion device 1 according to the first embodiment. FIG. 5 illustrates a simplified equivalent circuit. Thus, characteristics such as the voltage of the commercial power supply 110 and the induced voltage of the motor 314 are not simulated. FIG. 5 assumes that the inverter 310 is stopped at a time of 50 ms, and presents the current and voltage values at a time of 50 ms. Some waveforms in conditions where the inverter 310 is stopped operating when operating within and outside the range given by Formula (1) are illustrated in FIG. 6. FIG. 6 is a diagram illustrating examples of the capacitor voltage Vdc when the inverter 310 is stopped operating in the power conversion device 1 according to the first embodiment. FIG. 6(*a*) in the upper portion illustrates an inverter stop signal from the control unit 400. FIG. 6(*b*) in the lower portion illustrates the capacitor voltage Vdc. Parameter values are as follows, by way of example: L=2 [mH], Is=15 [A], Lm=9 [mH], Im=15 [A], Vdclim=400 [V], and Vcmax=310 [V]. The capacitance C of the capacitor 210 is given as 20 [uF], which is a value outside the range of Formula (1), 55 [uF], which is the value when the left-hand side and the right-hand side of Formula (1) have an equal value, and 100 [uF], which is a value within the range of Formula (1) when the right-hand side of Formula (1) has a large value.

As can also be seen in FIG. 6, use of the capacitance C of the capacitor 210 within the range of Formula (1) enables the power conversion device 1 to limit the increased voltage to the withstand voltage Vdclim of the element, thereby enabling a failure of the element to be prevented. Note that L of Formula (1) may additionally include an inductance component of an element such as a filter not illustrated in FIG. 1, a system impedance, and the like. In addition, Formula (1) is a simplified formula, and may further include the induced voltage of the motor 314, a voltage increase component due to the voltage of the commercial power supply 110, and the like.

In the power conversion device 1 of the present embodiment, the control unit 400 causes the output power of the inverter 310 to pulsate based on the frequency of the commercial power supply 110 as described above to reduce the current of the capacitor 210. This enables the ripple voltage of the capacitor 210 to be lower than the ripple voltage provided by use of a control method that causes an output power pulsation to flow at a constant value as in a typical inverter. "Causing power to pulsate" means causing the current of the inverter 310 to pulsate, and thus the above description also means that the capacitance C of the capacitor 210 can be reduced according to the pulsation of the output current of the inverter 310. In addition, causing the output of the inverter 310 to pulsate is equivalent to causing the input current to the inverter 310 to pulsate.

In this operation, when the power conversion device 1 is configured as illustrated in FIG. 1, the current of the capacitor 210 pulsates at a frequency of 2fs, which is twice the frequency of the commercial power supply 110, and the ripple voltage of the capacitor 210 also pulsates according to the frequency of 2fs as can also be seen in FIG. 3 or the like. Thus, the allowable ripple voltage can be determined based on the frequency of 2fs with respect to the ripple voltage of the capacitor 210, and the capacitance C of the capacitor 210 depends on the value of the allowable ripple voltage. The capacitance C of the capacitor 210 under the control of the present embodiment will fall within the range of Formula (2), where $\Delta V\_2fs$ represents the allowable ripple voltage of the capacitor 210 at the component of frequency 2fs, $Ic\_2fs$ represents the current of the capacitor 210 at the component of frequency 2fs when the output current of the inverter 310 under normal control includes no pulsation at the component of frequency 2fs, and $Im\_2fs$ represents the pulsation of the input current of the inverter 310 at the component of frequency 2fs when the control of the present embodiment is performed.

Formula 2:

$$C = \frac{1}{\Delta V\_2fs} \int_0^{\tau s/2} (Ic\_2fs - Im\_2fs) dt < \frac{1}{\Delta V\_2fs} \int_0^{\tau s/2} Ic\_2fs \, dt \quad (2)$$

Note that Formula (2) uses the frequency 2fs as the frequency that is twice the frequency of the commercial power supply 110, but this frequency is not limited to the frequency 2fs. The frequency 2fs may be replaced with a frequency that is an integer multiple of the frequency 2fs. Thus, satisfaction of the foregoing conditional expressions, i.e., Formulae (1) and (2), allows the power conversion device 1 to use the capacitor 210 having less capacity without addition of a discharge circuit or an overvoltage protection circuit to the capacitor 210.

As described above, in the power conversion device 1, the capacitance C of the capacitor 210 is greater than or equal to the capacitance of the capacitor 210 that would be set in a case where an overvoltage protection circuit will be connected to the capacitor 210. The capacitance C of the capacitor 210 is determined by a value calculated using the impedance of the reactor 120 disposed in the power conversion device 1, the system impedance Lk, the maximum current value Is of the commercial power supply 110, the inductance component Lm for one phase of the motor 314, the maximum current value Im of the motor 314, the withstand voltage Vdclim of the element to which the voltage from the capacitor 210 is applied, and the maximum voltage Vcmax of the capacitor 210 in a stationary state. The capacitance C of the capacitor 210 may be further limited by the system voltage of the commercial power supply 110 when the inverter 310 is out of operation, the induced voltage of the motor 314, and/or the like. In addition, the capacitance C of the capacitor 210 is less than the capacitance C of the capacitor 210 that would be set when first control is not performed, where the first control is control of the operation of the inverter 310 performed by the control unit 400 to output, from the inverter 310 to the load, the second AC power including a pulsation that depends on the pulsation of the power flowing from the rectification unit 130 to the capacitor 210. The capacitance C of the capacitor 210 is determined by a value calculated using the frequency 2fs, which is the frequency of the pulsation of the current of the capacitor 210, and is twice the frequency of the commercial power supply 110; the allowable ripple voltage $\Delta V\_2fs$ of the capacitor 210 at the frequency 2fs that is twice the frequency of the commercial power supply 110; the capacitor current $Ic\_2fs$ of the capacitor 210 at the frequency that is twice the frequency of the commercial power supply 110 when the control unit 400 does not perform the first control; and the input current pulsation $Im\_2fs$ of the inverter 310 at the frequency 2fs that is twice the frequency of the commercial power supply 110 when the control unit 400 performs the first control.

Figure 7:
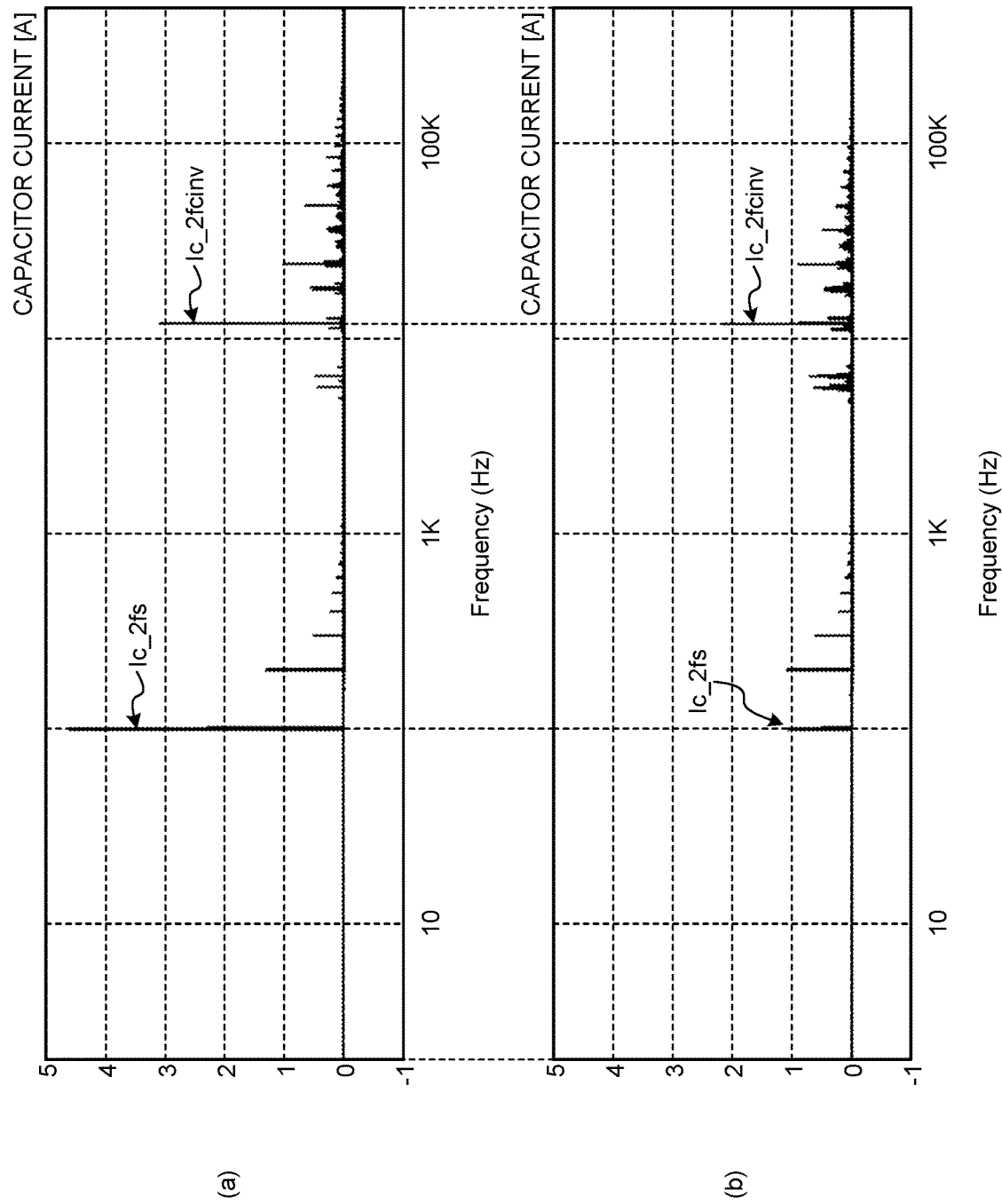
FIG. 7 is a diagram illustrating differences between the current flowing to the capacitor when control has not been performed to reduce the current flowing to the capacitor and the current flowing to the capacitor when such control has been performed, in the power conversion device according to the first embodiment.

In addition, the power conversion device 1 illustrated in FIG. 1 has been described as simulating no ripple current pulsation caused by switching of the switching elements 311a to 311f included in the inverter 310. However, driving the inverter 310 in practice causes a current having frequency components illustrated in FIG. 7 to flow to the capacitor 210. FIG. 7 is a diagram illustrating differences between the current flowing to the capacitor 210 when control has not been performed to reduce the current flowing to the capacitor 210 and the current flowing to the capacitor 210 when such control has been performed, in the power conversion device 1 according to the first embodiment. FIG. 7(a) in the upper portion illustrates the case in which control has not been performed to reduce the current flowing to the capacitor 210 in the power conversion device 1. FIG. 7(b) in the lower portion illustrates the case in which control has been performed to reduce the current flowing to the capacitor 210 in the power conversion device 1. As can be seen in FIG. 7, use of the control of the present embodiment causes the capacitor current $Ic\_2fs$ to be comparable to or less than a first capacitor current $Ic\_2fcinv$, where $Ic\_2fs$ is the capacitor current at the frequency component that is twice the frequency of the commercial power supply 110, and the first capacitor current $Ic\_2fcinv$ is the capacitor current at the frequency component that is twice a switching frequency fcinv of the switching elements 311a to 311f included in the inverter 310. In this case, the current flowing to the capacitor 210 is limited as expressed by Formula (3).

Formula 3:

$$Ic\_2fs \leq Ic\_2fcinv \quad (3)$$

Note that Formula (3) uses the frequency 2fs as the frequency that is twice the frequency of the commercial power supply 110, but this frequency is not limited to the frequency 2fs. The frequency 2fs may be replaced with a frequency that is an integer multiple of the frequency 2fs. Thus, satisfaction of the foregoing conditional expression, i.e., Formula (3), allows the power conversion device 1 to use a capacitor 210 having a low ripple current resistance capacity. As described above, the capacitor current Ic_2fs at the frequency component that is twice the frequency of the commercial power supply 110, of the current flowing to the capacitor 210, is less than or equal to the first capacitor current Ic_2fcinv at the frequency component that is twice the switching frequency of the switching elements 311a to 311f included in the inverter 310. The first capacitor current Ic_2fcinv may include a current component caused by rotation of the motor 314.

Figure 8:
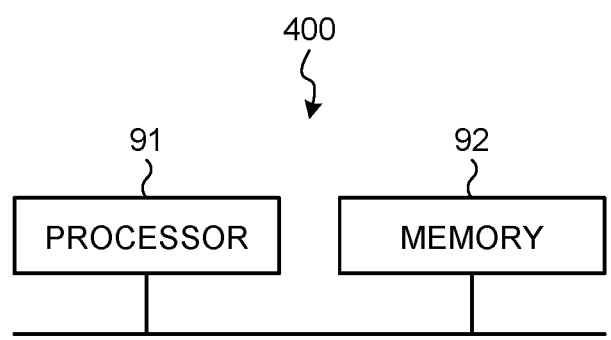
FIG. 8 is a diagram illustrating an example of hardware configuration that implements the control unit included in the power conversion device according to the first embodiment.

A hardware configuration of the control unit 400 included in the power conversion device 1 will next be described. FIG. 8 is a diagram illustrating an example of hardware configuration that implements the control unit 400 included in the power conversion device 1 according to the first embodiment. The control unit 400 is implemented by a set of a processor 91 and a memory 92.

The processor 91 is a central processing unit (CPU) (also known as processing unit, computing unit, microprocessor, microcomputer, processor, and digital signal processor (DSP)) or a system large scale integration (LSI). The memory 92 is, by way of example, a non-volatile or volatile semiconductor memory such as a random access memory (RAM), a read-only memory (ROM), a flash memory, an erasable programmable read-only memory (EPROM), or an electrically erasable programmable read-only memory (EEPROM) (registered trademark). Note that the memory 92 is not limited thereto, and may be a magnetic disk, an optical disk, a compact disc, a MiniDisc, or a digital versatile disc (DVD).

As described above, in the power conversion device 1 according to the present embodiment, the control unit 400 controls the operation of the inverter 310 based on detection values obtained from the respective detection units, and superimposes, on the current I2 flowing into the inverter 310, a pulsation having a frequency component that depends on the frequency component of the current I1 flowing from the rectification unit 130, thereby reducing the current I3 flowing into the smoothing unit 200. Thus, the reduction in the current I3 flowing into the smoothing unit 200 enables the power conversion device 1 to use a capacitor having a ripple current resistance capacity less than the ripple current resistance capacity of when the control of the present embodiment is not performed. In addition, a reduction in the pulsation voltage of the capacitor voltage Vdc enables the power conversion device 1 to use therein a capacitor 210 having a capacitance less than the capacitance of when the control of the present embodiment is not performed. For example, in a case in which the smoothing unit 200 includes multiple capacitors 210, the power conversion device 1 can reduce the number of the capacitors 210 included in the smoothing unit 200.

Moreover, by performing the control of the present embodiment, the power conversion device 1 can reduce vibration of the compressor 315 that may occur due to pulsation of the current I2.

Second Embodiment

A second embodiment will be described with respect to a case in which the power conversion device boosts the voltage of the first AC power supplied from the commercial power supply 110.

Figure 9:
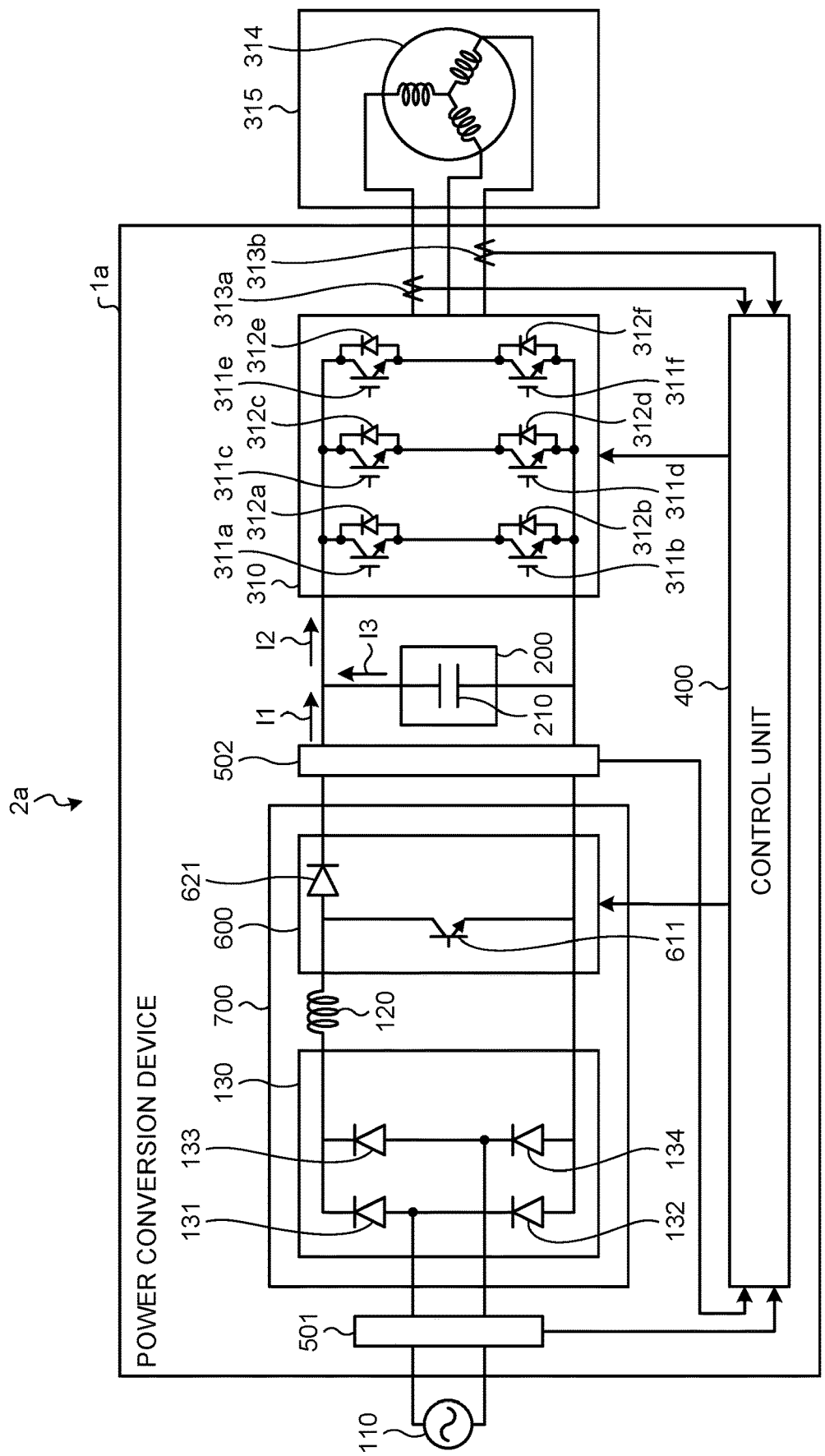
FIG. 9 is a diagram illustrating an example configuration of a power conversion device according to a second embodiment.

FIG. 9 is a diagram illustrating an example configuration of a power conversion device 1a according to the second embodiment. The power conversion device 1a is connected to the commercial power supply 110 and to the compressor 315. The power conversion device 1a converts the first AC power having the supply voltage Vs supplied from the commercial power supply 110 into the second AC power having desired amplitude and phase, and supplies the second AC power to the compressor 315. The power conversion device 1a includes the voltage-current detection unit 501, the rectification unit 130, the reactor 120, a booster unit 600, the voltage detection unit 502, the smoothing unit 200, the inverter 310, the current detection units 313a and 313b, and the control unit 400. Note that, in the power conversion device 1a, the rectification unit 130, the reactor 120, and the booster unit 600 together form a rectification-boost unit 700. In addition, the power conversion device 1a and the motor 314 included in the compressor 315 together form a motor drive unit 2a.

The voltage-current detection unit 501 detects a voltage value and a current value of the first AC power having the supply voltage Vs supplied from the commercial power supply 110, and outputs the voltage value and the current value detected to the control unit 400. The rectification unit 130 includes a bridge circuit including the rectifying elements 131 to 134. The rectification unit 130 rectifies the first AC power having the supply voltage Vs supplied from the commercial power supply 110, and outputs the power resulting from rectification. The reactor 120 is connected between the rectification unit 130 and the booster unit 600. The booster unit 600 includes a switching element 611 and a rectifying element 621. The booster unit 600 turns on or off the switching element 611 under control of the control unit 400 to boost the voltage of the power output from the rectification unit 130, and outputs the power having a boosted voltage to the smoothing unit 200. In the present embodiment, the booster unit 600 is fully controlled by the control unit 400 using full pulse amplitude modulation (PAM), which allows the switching element 611 to be switched steplessly. The power conversion device 1a uses the booster unit 600 to perform control for improving the power factor of the commercial power supply 110 thus to increase the capacitor voltage Vdc of the capacitor 210 of the smoothing unit 200 to a voltage higher than the supply voltage Vs. By using the rectification unit 130 and the booster unit 600, the rectification-boost unit 700 rectifies the first AC power supplied from the commercial power supply 110 and boosts the voltage of the first AC power supplied from the commercial power supply 110. The rectification-boost unit 700 of the present embodiment is configured such that the rectification unit 130 and the booster unit 600 are connected in series with each other.

The voltage detection unit 502 detects a voltage value of the power having a voltage boosted by the booster unit 600, and outputs the voltage value detected to the control unit 400. The smoothing unit 200 is connected to an output end of the booster unit 600 via the voltage detection unit 502. The smoothing unit 200 includes the capacitor 210, which functions as a smoothing element, to smooth the power having a voltage boosted by the booster unit 600. The capacitor 210 is, for example, an electrolytic capacitor, a film capacitor, or the like. The capacitor 210 has a capacitance sufficient for smoothing the power, resulting from rectification performed by the rectification unit 130 and having a voltage boosted by the booster unit 600. The voltage appearing on the capacitor 210 resulting from the smoothing has a waveform shape including a voltage ripple dependent on the frequency of the commercial power supply 110 being superimposed on a DC component, rather than a waveform shape of a full-wave rectified voltage of the commercial power supply 110, meaning that the voltage appearing on the capacitor 210 resulting from the smoothing does not have a high pulsation. This voltage ripple has a frequency that is twice the frequency of the supply voltage Vs when the commercial power supply 110 is of a single-phase type, and has a primary component that is six times the frequency of the supply voltage Vs when the commercial power supply 110 is of a three-phase type. In a condition where the power input from the commercial power supply 110 and the power output from the inverter 310 do not change, this voltage ripple has an amplitude that is determined based on the capacitance of the capacitor 210. For example, the voltage ripple appearing on the capacitor 210 pulsates in a range having a maximum value thereof that is less than twice a minimum value thereof.

The inverter 310 is connected to both ends of the smoothing unit 200, i.e., both ends of the capacitor 210. The inverter 310 includes the switching elements 311a to 311f and the freewheeling diodes 312a to 312f. The inverter 310 turns on or off the switching elements 311a to 311f under control of the control unit 400 to convert the power output from the rectification-boost unit 700 and from the smoothing unit 200 into the second AC power having desired amplitude and phase, and outputs the second AC power to the compressor 315. The current detection units 313a and 313b each detect a current value of one of three phase currents output from the inverter 310, and output the current value detected to the control unit 400. Note that obtaining current values of two phases of the three-phase current output from the inverter 310 allows the control unit 400 to calculate the current value of the other one phase output from the inverter 310. The compressor 315 is a load including the motor 314 for driving the compressor. The motor 314 rotates according to the amplitude and phase of the second AC power supplied from the inverter 310 thus to perform compression operation. For example, when the compressor 315 is a hermetic compressor for use in an apparatus such as an air conditioner, the load torque of the compressor 315 can often be considered as a constant torque load.

Note that, in the power conversion device 1a, the arrangement of the components illustrated in FIG. 9 is merely by way of example, and the arrangement of the components is not limited to the example illustrated in FIG. 9. The rectification-boost unit 700 does not necessarily need to include the reactor 120 depending on the disposition position of the reactor 120. In the following description, the voltage-current detection unit 501, the voltage detection unit 502, and the current detection units 313a and 313b may be referred to as detection unit without distinction. In addition, the voltage value and the current value detected by the voltage-current detection unit 501, the voltage value detected by the voltage detection unit 502, and the current values detected by the current detection units 313a and 313b may each be referred to as detection value.

The control unit 400 obtains a voltage value and a current value of the first AC power having the supply voltage Vs from the voltage-current detection unit 501, obtains a voltage value of the power having a voltage boosted by the booster unit 600 from the voltage detection unit 502, and obtains, from the current detection units 313a and 313b, a current value of the second AC power having desired amplitude and phase, obtained by conversion performed by the inverter 310. The control unit 400 controls the operation of the booster unit 600 of the rectification-boost unit 700, specifically, turning on or off of the switching element 611 included in the booster unit 600, using a detection value detected by each of the detection units. The control unit 400 also controls the operation of the inverter 310, specifically, turning on or off of the switching elements 311a to 311f included in the inverter 310, using a detection value detected by each of the detection units. In the present embodiment, the control unit 400 controls the operation of the rectification-boost unit 700. The control unit 400 controls the operation of the rectification-boost unit 700 to perform control for improving the power factor of the first AC power supplied from the commercial power supply 110 and control of the average voltage of the capacitor 210 of the smoothing unit 200. The control unit 400 also controls the operation of the inverter 310 to output, from the inverter 310 to the compressor 315, which is a load, the second AC power including a pulsation that depends on the pulsation of the power flowing from the rectification unit 130 to the capacitor 210 of the smoothing unit 200. An example of pulsation that depends on the pulsation of the power flowing to the capacitor 210 of the smoothing unit 200 is a pulsation that varies depending on a factor such as the frequency of the pulsation of the power flowing to the capacitor 210 of the smoothing unit 200. The control unit 400 reduces the current flowing to the capacitor 210 of the smoothing unit 200 through such operation. Note that the control unit 400 does not need to use all of the detection values obtained from the respective detection units, but may provide control using part of the detection values.

An operation of the control unit 400 included in the power conversion device 1a will next be described. The control unit 400 operates similarly to the control unit 400 in the first embodiment. In the description of the second embodiment, the current flowing from the rectification unit 130 of the first embodiment is to be read as the current flowing from the booster unit 600.

The frequency component of the current I1 is determined based on the frequency of the AC current supplied from the commercial power supply 110, on the configuration of the rectification unit 130, and on the switching speed of the switching element 611 of the booster unit 600. This enables the control unit 400 to bring the frequency component of the pulsating current superimposed on the current I2 to a frequency component having predetermined amplitude and phase. The frequency component of the pulsating current superimposed on the current I2 has a waveform similar to the waveform of the frequency component of the current I1. As the control unit 400 causes the frequency component of the pulsating current superimposed on the current I2 to approach the frequency component of the current I1, the current I3 flowing into the smoothing unit 200 is more reduced, thereby enabling the pulsation voltage appearing on the capacitor voltage Vdc to be more reduced.

The control operation performed by the control unit 400 on the pulsation of the current flowing into the inverter 310 through control of the operation of the inverter 310 is equivalent to controlling the pulsation of the second AC power output from the inverter 310 to the compressor 315. The control unit 400 controls the operation of the inverter 310 to reduce the pulsation included in the second AC power output from the inverter 310 to less than the pulsation of the power output from the rectification-boost unit 700. The control unit 400 controls the amplitude and phase of the pulsation included in the second AC power output from the inverter 310 to reduce the voltage ripple of the capacitor voltage Vdc, i.e., the voltage ripple appearing on the capacitor 210, to less than the voltage ripple appearing on the capacitor 210 of when the second AC power output from the inverter 310 includes no pulsation that depends on the pulsation of the power flowing to the capacitor 210. The situation in which the second AC power output from the inverter 310 includes no pulsation that depends on the pulsation of the power flowing to the capacitor 210 is a situation that is under a control such as one illustrated in FIG. 2.

In addition, when the control unit 400 controls the inverter 310 to output, from the inverter 310 to the compressor 315, the second AC power including a frequency component different from the frequency component of the first AC power supplied from the commercial power supply 110, the control unit 400 may superimpose the frequency component included in the second AC power that is output from the inverter 310 to the compressor 315, on a drive signal for turning on or off the switching element 611 of the booster unit 600. That is, the control unit 400 controls the operation of the rectification-boost unit 700, specifically, the operation of the switching element 611 of the booster unit 600, to output power including a variable frequency component from the rectification-boost unit 700, where the variable frequency component is different from a frequency component that is twice the frequency of the first AC power when the first AC power supplied from the commercial power supply 110 is of a single-phase type, and different from a frequency component that is six times the frequency of the first AC power when the first AC power supplied from the commercial power supply 110 is of a three-phase type, of the power pulsation of the second AC power output from the inverter 310 to the compressor 315. The control unit 400 may control the variable frequency component using a command value for the commercial power supply 110, or may control the variable frequency component to be not an integer multiple of up to 40th order of the frequency of the first AC power supplied from the commercial power supply 110, or to be less than or equal to a predetermined value, e.g., a desired specification value.

Figure 10:
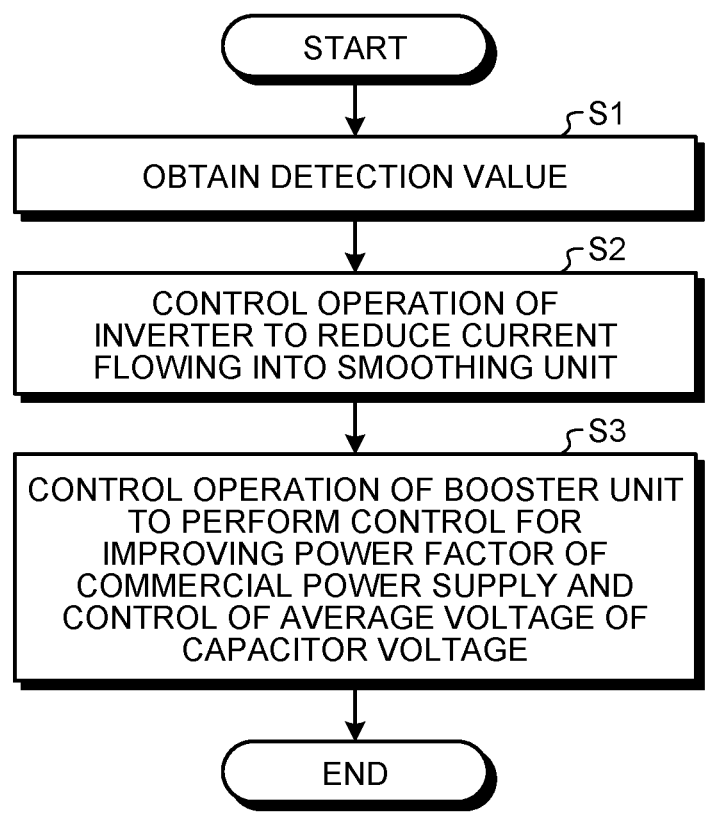
FIG. 10 is a flowchart illustrating an operation of the control unit included in the power conversion device according to the second embodiment.

An operation of the control unit 400 will next be described using a flowchart. FIG. 10 is a flowchart illustrating an operation of the control unit 400 included in the power conversion device 1a according to the second embodiment. The control unit 400 obtains detection values from the respective detection units of the power conversion device 1a (step S1). The control unit 400 controls the operation of the inverter 310 to reduce the current I3 flowing into the smoothing unit 200 based on the detection values obtained (step S2). The control unit 400 controls the operation of the booster unit 600 to perform control for improving the power factor of the commercial power supply 110 and control of the average voltage of the capacitor voltage Vdc of the capacitor 210 of the smoothing unit 200, based on the detection values obtained (step S3).

Note that, similarly to the power conversion device 1 of the first embodiment, the power conversion device 1a of the second embodiment also determines the capacitance C of the capacitor 210 within the ranges of Formulae (1) and (2) above. When the power conversion device 1a is configured as illustrated in FIG. 9, the inductance component L in the power conversion device 1a is a sum of an inductance component Lc of the reactor 120 for boosting and the system impedance Lk.

Figure 11:
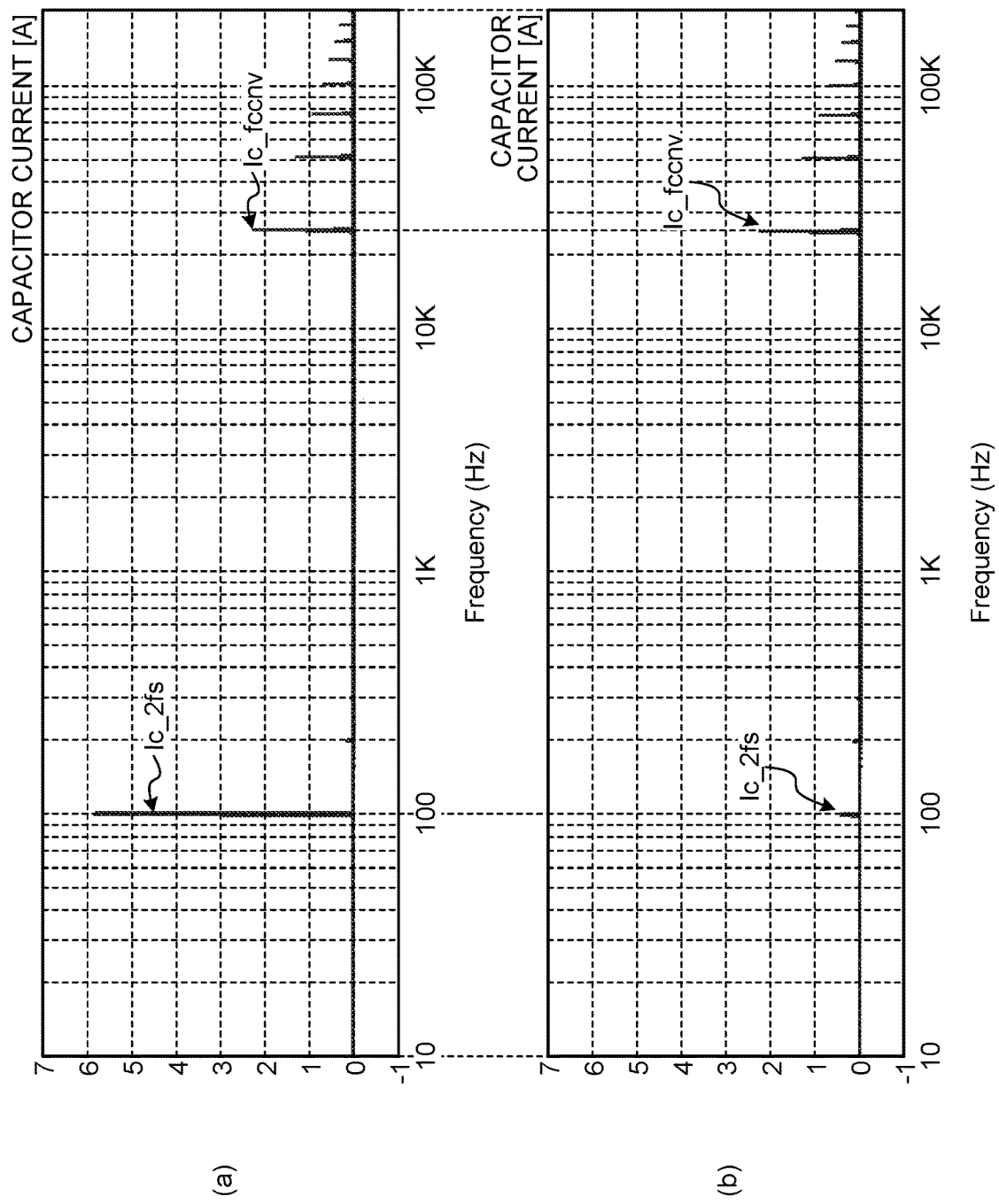
FIG. 11 is a diagram illustrating differences between the current flowing to the capacitor when control has not been performed to reduce the current flowing to the capacitor and the current flowing to the capacitor when such control has been performed, in the power conversion device according to the second embodiment.

In addition, similarly to the power conversion device 1 of the first embodiment, the power conversion device 1a of the second embodiment also limits the current flowing to the capacitor 210. When the power conversion device 1a illustrated in FIG. 9 drives the inverter 310 in practice, a current having frequency components illustrated in FIG. 7 flows to the capacitor 210 as described above. In addition, when the power conversion device 1a illustrated in FIG. 9 drives the booster unit 600 in practice, a current having frequency components illustrated in FIG. 11 flows to the capacitor 210. FIG. 11 is a diagram illustrating differences between the current flowing to the capacitor 210 when control has not been performed to reduce the current flowing to the capacitor 210 and the current flowing to the capacitor 210 when such control has been performed, in the power conversion device 1a according to the second embodiment. FIG. 11(a) in the upper portion illustrates the case in which control has not been performed to reduce the current flowing to the capacitor 210 in the power conversion device 1a. FIG. 11(b) in the lower portion illustrates the case in which control has been performed to reduce the current flowing to the capacitor 210 in the power conversion device 1a. Note that FIG. 11 omits the current pulsation components caused by the inverter 310 illustrated in FIG. 7. As can be seen in FIG. 11, use of the control of the present embodiment causes the capacitor current Ic_2fs to be comparable to or less than a second capacitor current Ic_fccnv, where Ic_2fs is the capacitor current at the frequency component that is twice the frequency of the commercial power supply 110, and the second capacitor current Ic_fccnv is the capacitor current at the frequency component of a switching frequency fccnv of the switching element 611 included in the booster unit 600. In this case, the current flowing to the capacitor 210 is limited as expressed by Formula (4).

Formula 4:

$$Ic\_2fs \leq Ic\_fccnv \qquad (4)$$

Note that Formula (4) uses the frequency 2fs as the frequency that is twice the frequency of the commercial power supply 110, but this frequency is not limited to the frequency 2fs. The frequency 2fs may be replaced with a frequency that is an integer multiple of the frequency 2fs. Thus, satisfaction of Formula (3) above, and the foregoing conditional expression, i.e., Formula (4), allows the power conversion device 1a to use a capacitor 210 having a low ripple current resistance capacity. As described above, when the power conversion device 1a includes the booster unit 600, which boosts the voltage of the first AC power, the capacitor current Ic_2fs at the frequency component that is twice the frequency of the commercial power supply 110, of the current flowing to the capacitor 210, is less than or equal to the second capacitor current Ic_fccnv at the frequency component that is twice the switching frequency of the switching element 611 included in the booster unit 600. The second capacitor current Ic_fccnv may include a current component caused by rotation of the motor 314.

As described above, in the power conversion device 1a according to the present embodiment, the control unit 400 controls the operation of the inverter 310 based on the detection values obtained from the respective detection units, and superimposes, on the current I2 flowing into the inverter 310, a pulsation having a frequency component that depends on the frequency component of the current I1 flowing from the rectification unit 130, thereby reducing the current I3 flowing into the smoothing unit 200. Thus, the reduction in the current I3 flowing into the smoothing unit 200 enables the power conversion device 1a to use a capacitor having a ripple current resistance capacity less than the ripple current resistance capacity of when the control of the present embodiment is not performed. In addition, a reduction in the pulsation voltage of the capacitor voltage Vdc enables the power conversion device 1a to use therein a capacitor 210 having a capacitance less than the capacitance of when the control of the present embodiment is not performed. For example, in a case in which the smoothing unit 200 includes multiple capacitors 210, the power conversion device 1a can reduce the number of the capacitors 210 included in the smoothing unit 200.

Moreover, by performing the control of the present embodiment, the power conversion device 1a can reduce vibration of the compressor 315 that may occur due to pulsation of the current I2.

Furthermore, the boosting operation of the booster unit 600 enables the power conversion device 1a to increase the capacitor voltage Vdc of the capacitor 210, and thus to increase the range of voltage that can be output from the inverter 310. In the power conversion device 1a, the control unit 400 superimposes, on the drive signal for the switching element 611 of the booster unit 600, a frequency component of the pulsation included in the second AC power output from the inverter 310, and can thus reduce pulsations of the current I3 and of the capacitor voltage Vdc caused by that frequency component.

Third Embodiment

A third embodiment will be described with respect to a power conversion device including a rectification-boost unit having a circuit configuration different from the circuit configuration of the rectification-boost unit 700 of the power conversion device 1a of the second embodiment.

Figure 12:
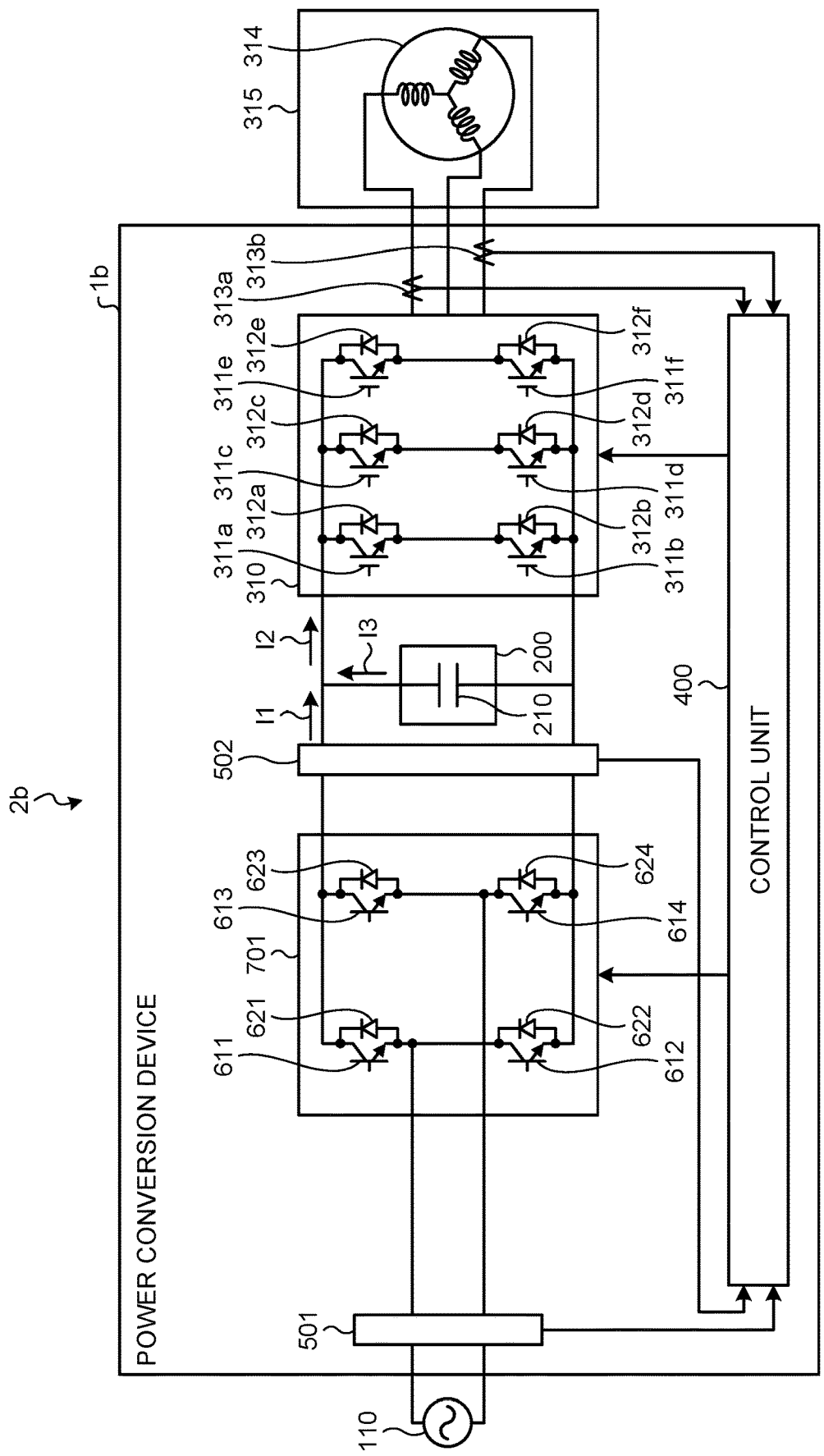
FIG. 12 is a diagram illustrating an example configuration of a power conversion device according to a third embodiment.

FIG. 12 is a diagram illustrating an example configuration of a power conversion device 1b according to the third embodiment. The power conversion device 1b includes a rectification-boost unit 701 in place of the rectification-boost unit 700 of the power conversion device 1a of the second embodiment illustrated in FIG. 9. Note that the power conversion device 1b and the motor 314 included in the compressor 315 together form a motor drive unit 2b. The rectification-boost unit 701 includes switching elements 611 to 614 and rectifying elements 621 to 624 connected in parallel with respective corresponding ones of the switching elements 611 to 614. The rectification-boost unit 701 turns on or off the switching elements 611 to 614 under control of the control unit 400 to rectify and boost the first AC power output from the commercial power supply 110, and outputs the power having a boosted voltage to the smoothing unit 200. In the present embodiment, the rectification-boost unit 701 is fully controlled by the control unit 400 using full PAM, which allows the switching elements 611 to 614 to be switched continuously. The power conversion device 1b uses the rectification-boost unit 701 to perform control for improving the power factor of the commercial power supply 110 thus to increase the capacitor voltage Vdc of the capacitor 210 of the smoothing unit 200 to a voltage higher than the supply voltage Vs.

The control unit 400 obtains a voltage value and a current value of the first AC power having the supply voltage Vs from the voltage-current detection unit 501, obtains a voltage value of the power having a voltage boosted by the rectification-boost unit 701 from the voltage detection unit 502, and obtains, from the current detection units 313a and 313b, a current value of the second AC power having desired amplitude and phase, obtained by conversion performed by the inverter 310. The control unit 400 controls the operation of the inverter 310, specifically, turning on or off of the switching elements 311a to 311f included in the inverter 310, using a detection value detected by each of the detection units. In addition, the control unit 400 controls the operation of the rectification-boost unit 701, specifically, turning on or off the switching elements 611 to 614 included in the rectification-boost unit 701, using a detection value detected by each of the detection units. The control unit 400 controls the operation of the rectification-boost unit 701 and the operation of the inverter 310 to provide an advantage similar to the advantage described in connection with the first embodiment.

The other part of the operation of the power conversion device 1b is similar to the corresponding part of the operation of the power conversion device 1a of the second embodiment. Also in this respect, the power conversion device 1b can provide an advantage similar to the advantage of the power conversion device 1a of the second embodiment.

Note that the power conversion device 1b of the third embodiment limits the range of the capacitance C of the capacitor 210 and the current flowing to the capacitor 210 in a similar manner to the power conversion device 1a of the second embodiment. When the power conversion device 1b is configured as illustrated in FIG. 12, the inductance component L in the power conversion device 1b is a sum of the inductance component La of the reactor 120 and the system impedance Lk. Thus, when the power conversion device 1b includes the rectification-boost unit 701, which rectifies the first AC power supplied from the commercial power supply 110, and boosts the voltage of the resulting first AC power, the capacitor current Ic_2fs at the frequency component that is twice the frequency of the commercial power supply 110, of the current flowing to the capacitor 210, is less than or equal to the second capacitor current Ic_fccnv at the frequency component of the switching frequency of the switching elements 611 to 614 included in the rectification-boost unit 701. The second capacitor current Ic_fccnv may include a current component caused by rotation of the motor 314.

Fourth Embodiment

A fourth embodiment will be described with respect to a power conversion device including a rectification-boost unit having a circuit configuration different from the circuit configuration of the rectification-boost unit 700 of the power conversion device 1a of the second embodiment and from the circuit configuration of the rectification-boost unit 701 of the power conversion device 1b of the third embodiment.

Figure 13:
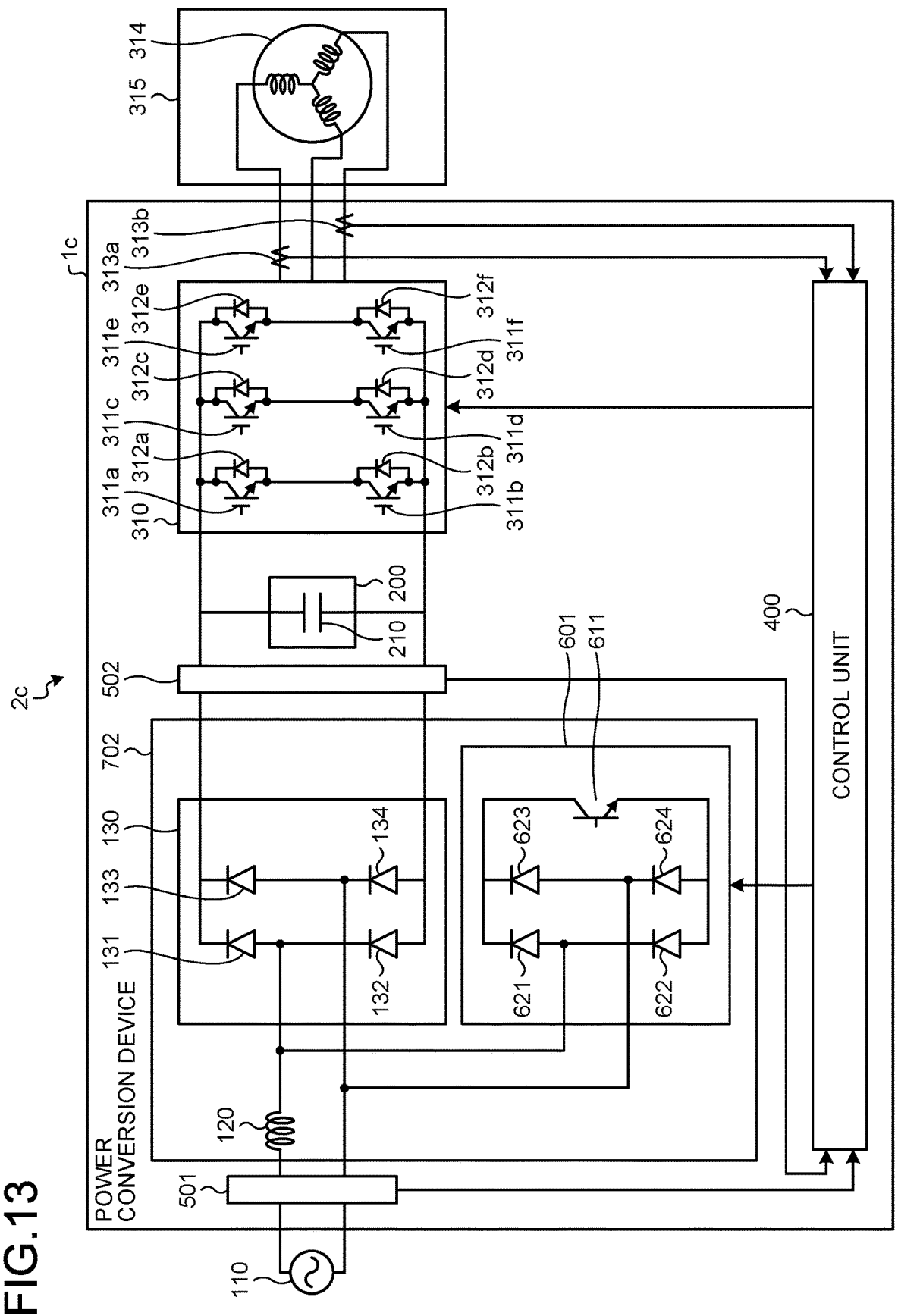
FIG. 13 is a diagram illustrating an example configuration of a power conversion device according to a fourth embodiment.

FIG. 13 is a diagram illustrating an example configuration of a power conversion device 1c according to the fourth embodiment. The power conversion device 1c includes a rectification-boost unit 702 in place of the rectification-boost unit 700 of the power conversion device 1a of the second embodiment illustrated in FIG. 9. Note that the power conversion device 1c and the motor 314 included in the compressor 315 together form a motor drive unit 2c. The rectification-boost unit 702 includes the reactor 120, the rectification unit 130, and a booster unit 601. In contrast to the second embodiment, in which the booster unit 600 is connected downstream of the rectification unit 130, that is, connected in series with the rectification unit 130 inside the power conversion device 1a, the booster unit 601 in the fourth embodiment is connected in parallel with the rectification unit 130 inside the power conversion device 1c. The booster unit 601 includes the rectifying elements 621 to 624 and the switching element 611. The booster unit 601 turns on or off the switching element 611 under control of the control unit 400 to boost the voltage of the first AC power output from the commercial power supply 110, and outputs the power having a boosted voltage to the rectification unit 130. In the present embodiment, the booster unit 601 of the rectification-boost unit 702 is controlled by the control unit 400 using simplified switching, in which the switching element 611 is switched one or more times in every half period of the frequency of the first AC power supplied from the commercial power supply 110. The power conversion device 1c uses the booster unit 601 to perform control for improving the power factor of the commercial power supply 110 thus to increase the capacitor voltage Vdc of the capacitor 210 of the smoothing unit 200 to a voltage higher than the supply voltage Vs.

The control unit 400 obtains a voltage value and a current value of the first AC power having the supply voltage Vs from the voltage-current detection unit 501, obtains a voltage value of the power resulting from rectification performed by the rectification unit 130 from the voltage detection unit 502, and obtains, from the current detection units 313a and 313b, a current value of the second AC power having desired amplitude and phase, obtained by conversion performed by the inverter 310. The control unit 400 controls the operation of the inverter 310, specifically, turning on or off of the switching elements 311a to 311f included in the inverter 310, using a detection value detected by each of the detection units. The control unit 400 also controls the operation of the booster unit 601, specifically, turning on or off of the switching element 611 included in the booster unit 601, using a detection value detected by each of the detection units. The control unit 400 controls the operation of the booster unit 601 and the operation of the inverter 310 to provide an advantage similar to the advantage described in connection with the second embodiment.

The other part of the operation of the power conversion device 1c is similar to the corresponding part of the operation of the power conversion device 1a of the second embodiment. Also in this respect, the power conversion device 1c can provide an advantage similar to the advantage of the power conversion device 1a of the second embodiment. In addition, the power conversion device 1c reduces the number of switchings as compared to the power conversion device 1a of the second embodiment and to the power conversion device 1b of the third embodiment, and can thus reduce a loss and noise. Moreover, the power conversion device 1c is configured such that the rectification unit 130 and the booster unit 601 are connected in parallel with each other, and can thus reduce the number of elements in conduction by not switching when the switching element 611 needs no switching in the booster unit 601, thereby allowing a reduction in loss.

Note that the power conversion device 1c of the fourth embodiment limits the range of the capacitance C of the capacitor 210 and the current flowing to the capacitor 210 in a similar manner to the power conversion device 1a of the second embodiment. When the power conversion device 1c is configured as illustrated in FIG. 13, the inductance component L in the power conversion device 1c is a sum of the inductance component La of the reactor 120 and the system impedance Lk.

Fifth Embodiment

Figure 14:
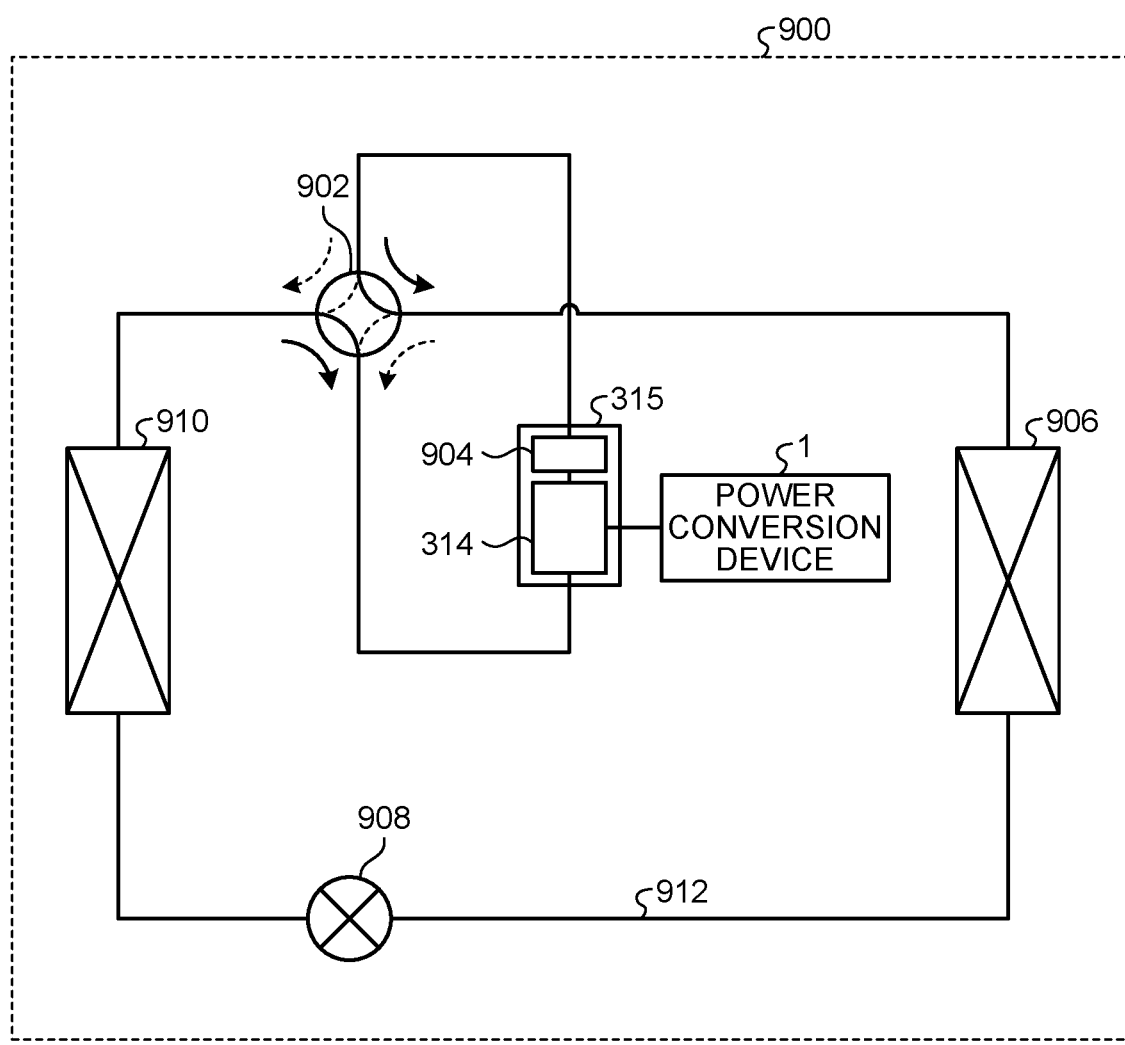
FIG. 14 is a diagram illustrating an example configuration of a refrigeration cycle apparatus according to a fifth embodiment.

FIG. 14 is a diagram illustrating an example configuration of a refrigeration cycle apparatus 900 according to a fifth embodiment. The refrigeration cycle apparatus 900 according to the fifth embodiment includes the power conversion device 1 described in the first embodiment. The refrigeration cycle apparatus 900 may include, in place of the power conversion device 1, the power conversion device 1a described in the second embodiment, the power conversion device 1b described in the third embodiment, or the power conversion device 1c described in the fourth embodiment. The refrigeration cycle apparatus 900 according to the fifth embodiment is usable in products including a refrigeration cycle, such as an air conditioner, a refrigerator, a freezer, and a heat pump water heater. Note that in FIG. 14, components having functionality similar to the functionality in the first embodiment are designated by the same reference characters as those used in the first embodiment.

The refrigeration cycle apparatus 900 is configured to include the compressor 315 incorporating the motor 314 of the first embodiment, a four-way valve 902, an indoor heat exchanger 906, an expansion valve 908, and an outdoor heat exchanger 910, all of which are connected to each other with a refrigerant pipe 912 interposed therebetween.

The compressor 315 includes therein a compression mechanism 904 for compressing a refrigerant, and the motor 314 for driving the compression mechanism 904.

The refrigeration cycle apparatus 900 is capable of heating operation or cooling operation based on a switching status of the four-way valve 902. The compression mechanism 904 is driven by the motor 314 under variable-speed control.

During heating operation, as indicated by the solid line arrow, the refrigerant is compressed and discharged by the compression mechanism 904, flows through the four-way valve 902, the indoor heat exchanger 906, the expansion valve 908, the outdoor heat exchanger 910, and the four-way valve 902, and then returns to the compression mechanism 904.

During cooling operation, as indicated by the broken line arrow, the refrigerant is compressed and discharged by the compression mechanism 904, flows through the four-way valve 902, the outdoor heat exchanger 910, the expansion valve 908, the indoor heat exchanger 906, and the four-way valve 902, and then returns to the compression mechanism 904.

During heating operation, the indoor heat exchanger 906 functions as a condenser to release heat, and the outdoor heat exchanger 910 functions as an evaporator to absorb heat. During cooling operation, the outdoor heat exchanger 910 functions as a condenser to release heat, and the indoor heat exchanger 906 functions as an evaporator to absorb heat. The expansion valve 908 decompresses and expands the refrigerant.

The configurations described in the foregoing embodiments are merely examples. These configurations may be combined with a known other technology, and configurations of different embodiments may be combined together. Moreover, part of the configurations may be omitted and/or modified without departing from the spirit thereof.

The invention claimed is:
1. A power conversion device comprising:
a rectification unit that rectifies first alternating current power supplied from a commercial power supply;
a capacitor connected to an output end of the rectification unit;
an inverter that converts power output from the rectification unit and from the capacitor into second alternating current power, and outputs the second alternating current power, to a load including a motor, the inverter being connected to both ends of the capacitor; and
a control unit that controls operation of only the inverter to output the second alternating current power from the inverter to the load to reduce current flowing to the capacitor, the second alternating current power includ- ing a pulsation that depends on a pulsation of power flowing from the rectification unit to the capacitor, wherein no discharge circuit and no overvoltage protection circuit are provided for the capacitor, the capacitor has a capacitance greater than or equal to a capacitance of the capacitor that would be set when an overvoltage protection circuit is connected to the capacitor, and the capacitance of the capacitor is determined by a value calculated using impedance of a reactor disposed in the power conversion device, system impedance, a maximum current value of the commercial power supply, an inductance component for one phase of the motor, a maximum current value of the motor, a withstand voltage of an element to which a voltage from the capacitor is applied, and a maximum voltage of the capacitor in a stationary state.

2. The power conversion device according to claim 1, wherein the capacitance of the capacitor is further limited by a system voltage of the commercial power supply when the inverter is out of operation, and by an induced voltage of the motor.

3. The power conversion device according to claim 1, wherein the capacitor has a capacitance less than a capacitance of the capacitor that would be set when first control is not performed, the first control being control of operation of the inverter performed by the control unit to output, from the inverter to the load, the second alternating current power including a pulsation that depends on a pulsation of power flowing from the rectification unit to the capacitor.

4. The power conversion device according to claim 3, wherein the capacitance of the capacitor is determined by a value calculated using a frequency of pulsation of current of the capacitor, the frequency being twice a frequency of the commercial power supply, an allowable ripple voltage of the capacitor at the frequency that is twice the frequency of the commercial power supply, a capacitor current of the capacitor at the frequency that is twice the frequency of the commercial power supply when the control unit does not perform the first control, and an input current pulsation of the inverter at the frequency that is twice the frequency of the commercial power supply when the control unit performs the first control.

5. The power conversion device according to claim 1, wherein a capacitor current at a frequency component that is twice the frequency of the commercial power supply, of the current flowing to the capacitor, is less than or equal to a first capacitor current at a frequency component that is twice a switching frequency of a switching element included in the inverter.

6. The power conversion device according to claim 5, wherein the first capacitor current includes a current component caused by rotation of the motor.

7. The power conversion device according to claim 5, comprising:

a booster unit that boosts a voltage of the first alternating current power, or in place of the rectification unit, a rectification-boost unit that rectifies the first alternating current power supplied from the commercial power supply, and boosts the voltage of the first alternating current power, wherein the capacitor current at the frequency component that is twice the frequency of the commercial power supply, of the current flowing to the capacitor, is less than or equal to a second capacitor current at a frequency component that is twice a switching frequency of a switching element included in the booster unit or in the rectification-boost unit.

8. The power conversion device according to claim 7, wherein the second capacitor current includes a current component caused by rotation of the motor.

9. The power conversion device according to claim 1, wherein the capacitor is an electrolytic capacitor or a film capacitor.

10. The power conversion device according to claim 1, wherein a voltage ripple appearing on the capacitor has a maximum value thereof less than twice a minimum value thereof.

11. The power conversion device according to claim 1, wherein the rectification unit performs full-wave rectification, and a voltage appearing on the capacitor does not have a waveform shape of a full-wave rectified voltage of the commercial power supply.

12. The power conversion device according to claim 1, wherein the discharge circuit includes an active element and a resistor, and switches a connect-disconnect status of the resistor for the capacitor by turning on or off of the active element.

13. The power conversion device according to claim 1, wherein the overvoltage protection circuit protects a device to prevent a voltage of the capacitor from increasing by a certain voltage or more, the overvoltage protection circuit not being a snubber circuit that protects a switching element from a surge voltage generated upon switching of a switching element.

14. A motor drive unit comprising the power conversion device according to claim 1.

15. A refrigeration cycle apparatus comprising the power conversion device according to claim 1.

* * * * *